(12) United States Patent  
Dnestrianschii et al.

(10) Patent No.: US 7,886,942 B2
(45) Date of Patent: Feb. 15, 2011

(54) VALVE FOR LIQUID DISPENSING SYSTEM

(75) Inventors: Lucien Dnestrianschii, Edmonton (CA); Kelly George Almond, 9125-180 A Avenue NW, Edmonton, Alberta (CA) T5Z 2K5

(73) Assignee: Kelly George Almond, Edmonton (CA)

( * ) Notice: Subject to any disclaimer, the term of this patent is extended or adjusted under 35 U.S.C. 154(b) by 677 days.

(21) Appl. No.: 11/010,782

(22) Filed: Dec. 13, 2004

(65) Prior Publication Data

US 2006/0124884 A1 Jun. 15, 2006

(51) Int. Cl.
*F16K 31/44* (2006.01)

(52) U.S. Cl. .................. 222/518; 222/505; 222/514; 251/322; 251/325; 251/354

(58) Field of Classification Search .............. 222/518, 222/505, 513, 514; 251/320–322, 353, 354, 251/325
See application file for complete search history.

(56) References Cited

U.S. PATENT DOCUMENTS

| | | | | |
|---|---|---|---|---|
| 2,686,652 A | * | 8/1954 | Carlson et al. | 222/402.24 |
| 3,206,075 A | * | 9/1965 | Scholle | 222/105 |
| 3,252,634 A | * | 5/1966 | Scholle | 222/514 |
| 4,655,374 A | * | 4/1987 | Guerette | 222/504 |
| 4,671,436 A | * | 6/1987 | Hagan | 222/402.25 |
| 2003/0006254 A1 | * | 1/2003 | Itou et al. | 222/518 |

\* cited by examiner

*Primary Examiner*—J. Casimer Jacyna
(74) *Attorney, Agent, or Firm*—Christensen O'Connor Johnson Kindness PLLC

(57) ABSTRACT

A valve for a liquid dispensing system includes a casing having an interior sidewall. A hollow dispensing pin is positioned within the casing. The dispensing pin has a first end, a second end, an exterior surface, and an interior flow passage. At least one radial dispensing passage extends from the interior flow passage through to the exterior surface at the first end of the dispensing pin. A first plunger is disposed between the interior sidewall of the casing and the exterior surface of the dispensing pin. The first plunger engages both the interior surface of the casing and the exterior surface of the dispensing pin. The first plunger is movable between a closed position blocking any flow through the at least one radial dispensing passage and an open position toward the second end of the dispensing pin spaced from the at least one radial dispensing passage.

13 Claims, 12 Drawing Sheets

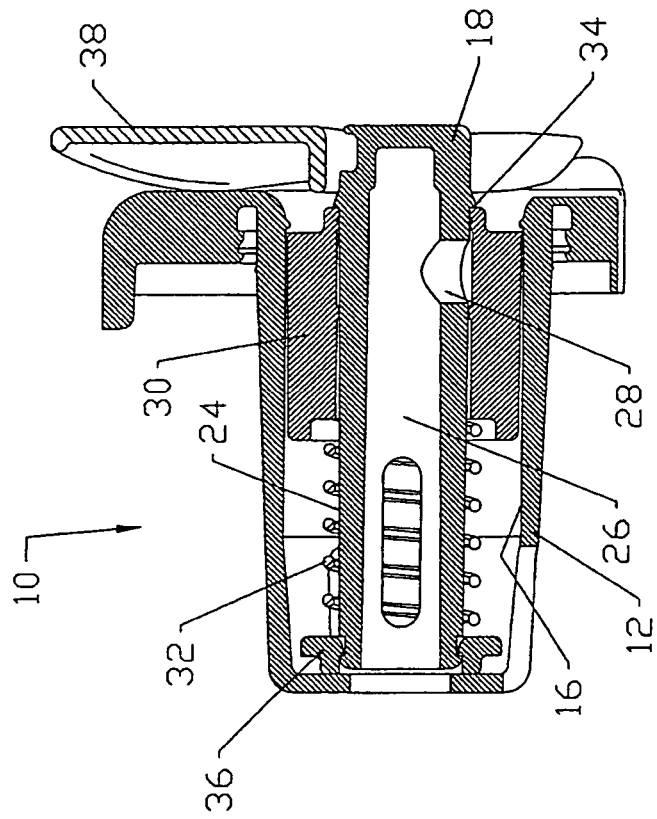
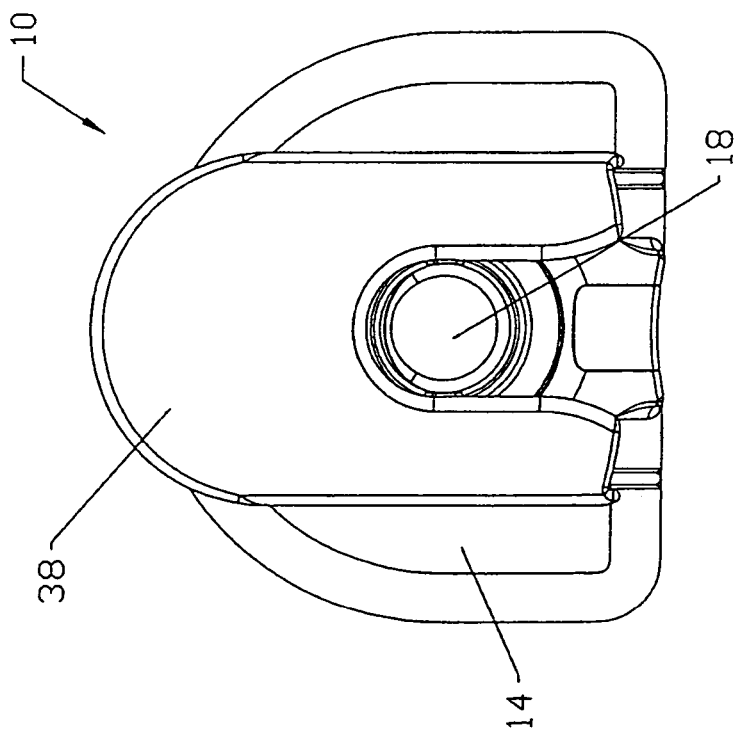

VALVE FOR LIQUID DISPENSING SYSTEM

FIELD OF THE INVENTION

The present invention relates to a valve suitable for use in a liquid dispensing system which dispenses liquid from a container.

BACKGROUND OF THE INVENTION

There are different types of liquid dispensing systems. Some liquid dispensing systems require a valve, which can be manually activated by the user from a normally closed position to an open position. Other liquid dispensing systems require a valve that, when engaged with a coupling remains in an open position, but moves to a closed position when detached from the coupling.

SUMMARY OF THE INVENTION

The present invention relates to a valve construction which can be adapted solely for manual activation, can be adapted solely for use with a coupling or can be adapted for dual activation system.

According to a first aspect of the present invention there is provided a valve for a liquid dispensing system which includes a casing having an interior sidewall. A hollow dispensing pin is positioned within the casing. The dispensing pin has a first end, a second end, an exterior surface, and an interior flow passage. At least one radial dispensing passage extends from the interior flow passage through to the exterior surface at the first end of the dispensing pin. A first plunger is disposed between the interior sidewall of the casing and the exterior surface of the dispensing pin. The first plunger engages both the interior surface of the casing and the exterior surface of the dispensing pin. The first plunger is movable between a closed position blocking any flow through the at least one radial dispensing passage and an open position toward the second end of the dispensing pin spaced from the at least one radial dispensing passage. Means is provided for biasing the first plunger toward a normally closed position. This dispensing plunger is intended to be primarily activated through the use of a hose coupling or a pin coupling.

According to a second aspect of the present invention there is provided a valve for a liquid dispensing system which includes a casing having a first end, a second end, and an interior sidewall that extends between the first end and the second end. A hollow dispensing pin plunger is centrally positioned within the casing. The dispensing pin plunger has a first end, a second end, an exterior surface, and an interior flow passage. At least one radial dispensing passage extends from the interior flow passage through to the exterior surface at the first end of the dispensing pin plunger. The dispensing pin plunger is movable between a closed position recessed within the casing with any flow through the at least one radial dispensing passage blocked and an open position in which the first end of the dispensing pin plunger projects from the casing with the at least one radial dispensing passage spaced from the casing. A spring biases the dispensing pin plunger toward a normally closed position. This dispensing valve is intended to be primarily activated manually.

According to a third aspect of the present invention there is provided a valve for a liquid dispensing system which includes a casing having a first end, a second end, and an interior sidewall that extends between the first end and the second end. A hollow dispensing pin plunger is centrally positioned within the casing. The dispensing pin plunger has a first end, a second end, an exterior surface, and an interior flow passage. At least one radial dispensing passage extends from the interior flow passage through to the exterior surface at the first end of the dispensing pin. An annular plunger is disposed between the interior sidewall of the casing and the exterior surface of the dispensing pin plunger. The annular plunger engages both the interior surface of the casing and the exterior surface of the dispensing pin plunger. The annular plunger has a first end and a second end. The annular plunger is movable between a closed position blocking any flow through the at least one radial dispensing passage and an open position toward the second end of the dispensing pin plunger spaced from the at least one radial dispensing passage. The dispensing pin plunger is movable between a closed position recessed within the casing with any flow through the at least one radial dispensing passage blocked by the annular plunger and an open position in which the first end of the dispensing pin plunger projects from the casing past the first end of the annular plunger with the at least one radial dispensing passage spaced from the annular plunger. A spring is positioned between the second end of the annular plunger and the second end of the dispensing pin plunger. The spring acts upon both the annular plunger and the dispensing pin plunger to bias them toward a normally closed position. This dispensing valve has dual means of activation, depending upon whether the dispensing pin plunger or the annular plunger is acted upon.

For this third aspect of the present invention, the valve can be activated through the use of a hose coupling or a pin coupling by initially removing a detachable handle provided for manually dispensing.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein:

FIG. 5 is a front elevation view of the valve illustrated in FIG. 1 in a closed position;

FIG. 6 is a side elevation view, in section, of the valve illustrated in FIG. 1 in a closed position;

DETAILED DESCRIPTION OF THE PREFERRED EMBODIMENT

Figure 1:
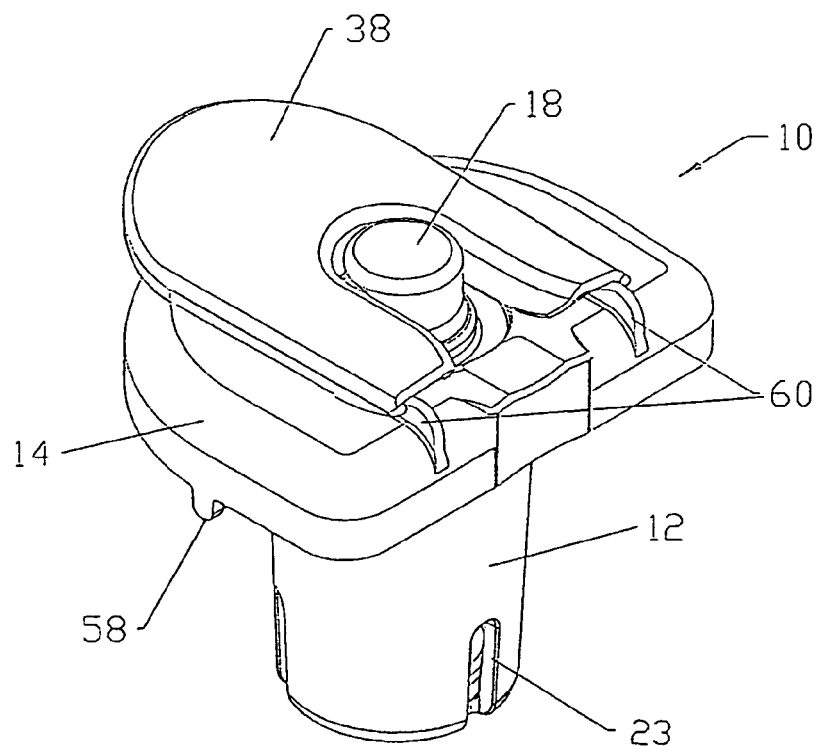
FIG. 1 is a top perspective view of a valve for liquid dispensing system according to the teachings of the present invention.

The preferred embodiment, a valve for liquid dispensing system generally identified by reference numeral 10, will now be described with reference to FIGS. 1 through 11.

Figure 2:
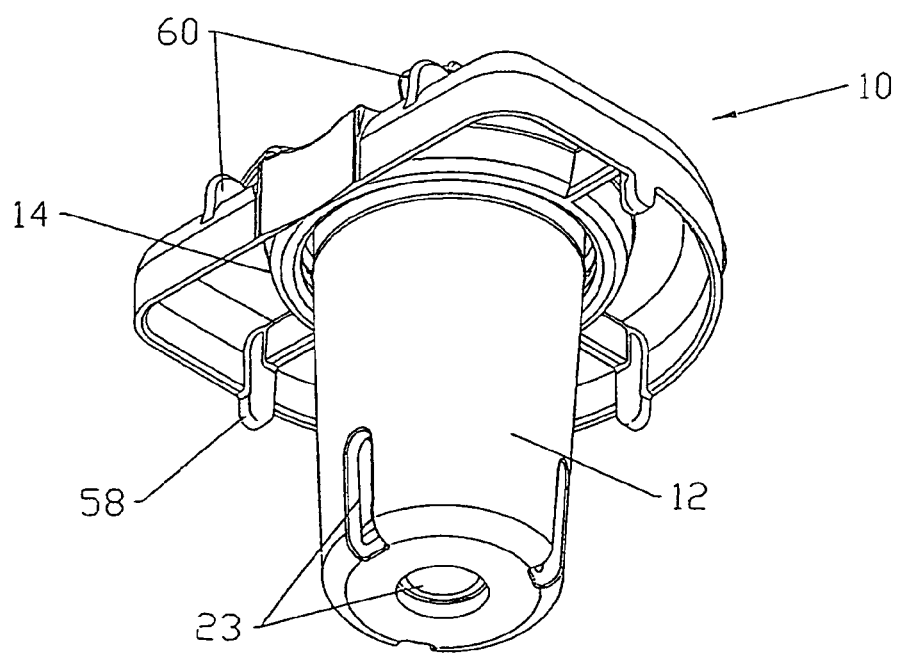
FIG. 2 is a bottom perspective view of the valve illustrated in FIG. 1.
Figure 3:
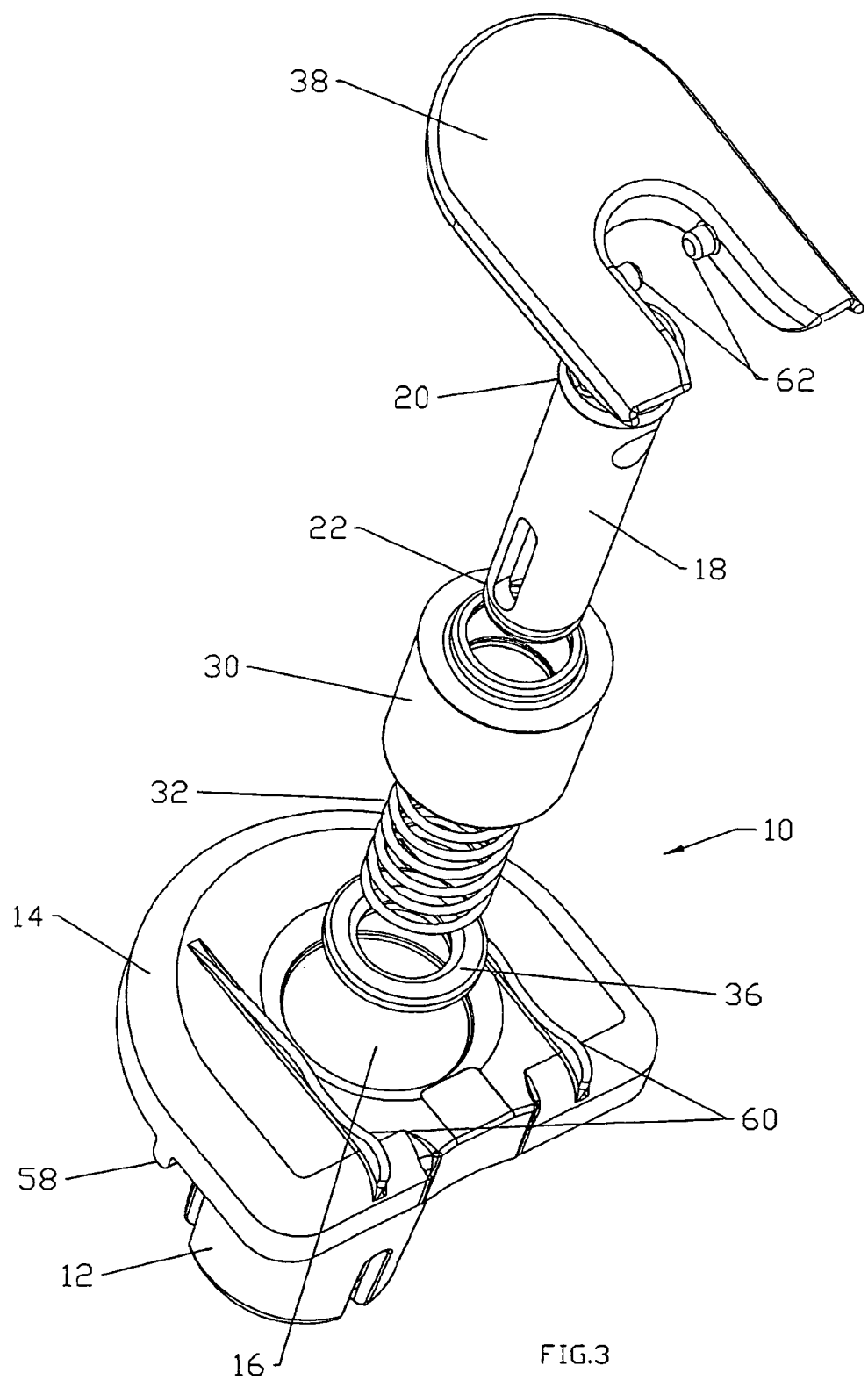
FIG. 3 is an exploded view of the valve illustrated in FIG. 1.
Figure 8:
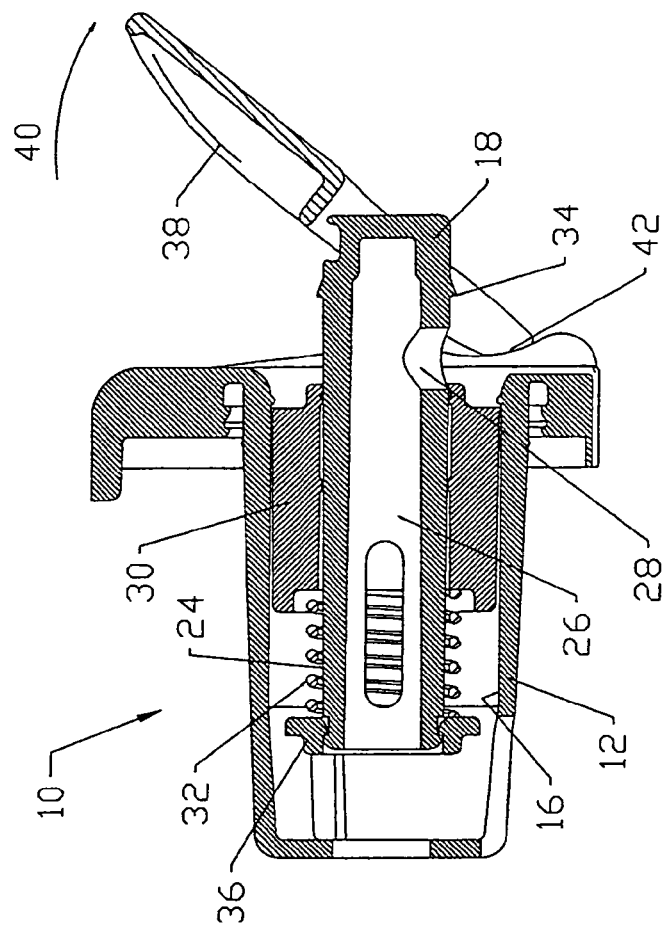
FIG. 8 is a side elevation view, in section, of the valve illustrated in FIG. 1, in an open position.
Figure 7:
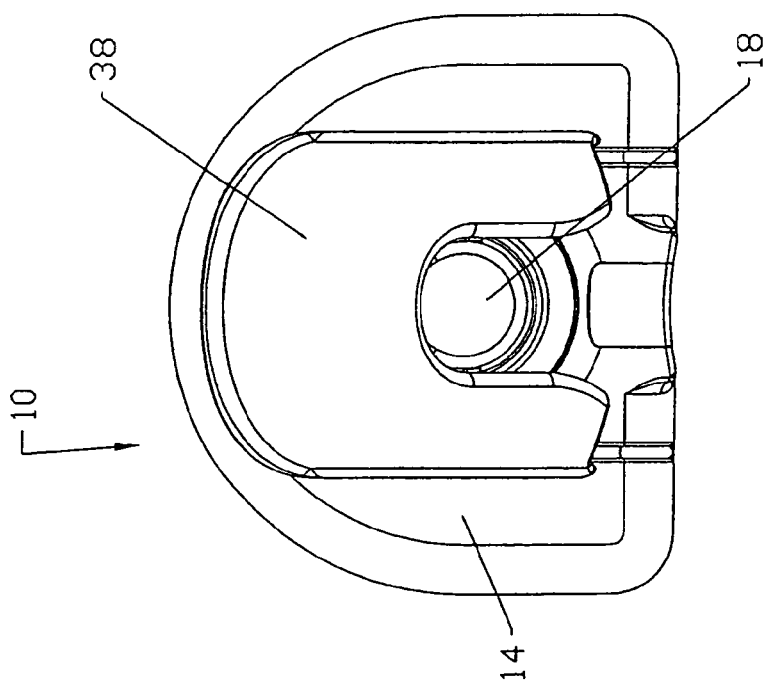
FIG. 7 is a front elevation view of the valve illustrated in FIG. 1, in an open position.

Structure and Relationship of Parts:

Referring to FIGS. 1 and 2, valve 10 has a casing 12 having an outwardly extending mounting flange 14. Referring to FIG. 3, casing 12 has an interior sidewall 16. A hollow dispensing pin 18 is positioned within casing 12 having a first end 20 and a second end 22. Referring to FIGS. 1 and 2, flow opening 23 are provided on outwardly extending mounting flange 14 to allow for the passage of liquid. Referring to FIGS. 6 and 8, pin 18 has an exterior surface 24, an interior flow passage 26, at least one radial dispensing passage 28 from interior flow passage 26 through to exterior surface 24 at first end 20. In the illustrated embodiment, an annular plunger 30 is disposed between interior sidewall 16 of casing 12 and exterior surface 24 of pin 18, engaging both interior sidewall 16 and exterior surface 24. Annular plunger 30 is movable between a closed position illustrated in FIGS. 5 and 6, blocking any flow through radial dispensing passage 28 and an open position illustrated in FIGS. 7 and 8, toward second end 22 of pin 18 spaced from radial dispensing passage 28. In the illustrated embodiment, a spring 32 is provided for biasing first plunger 30 toward a normally closed position.

Figures 9, 10:
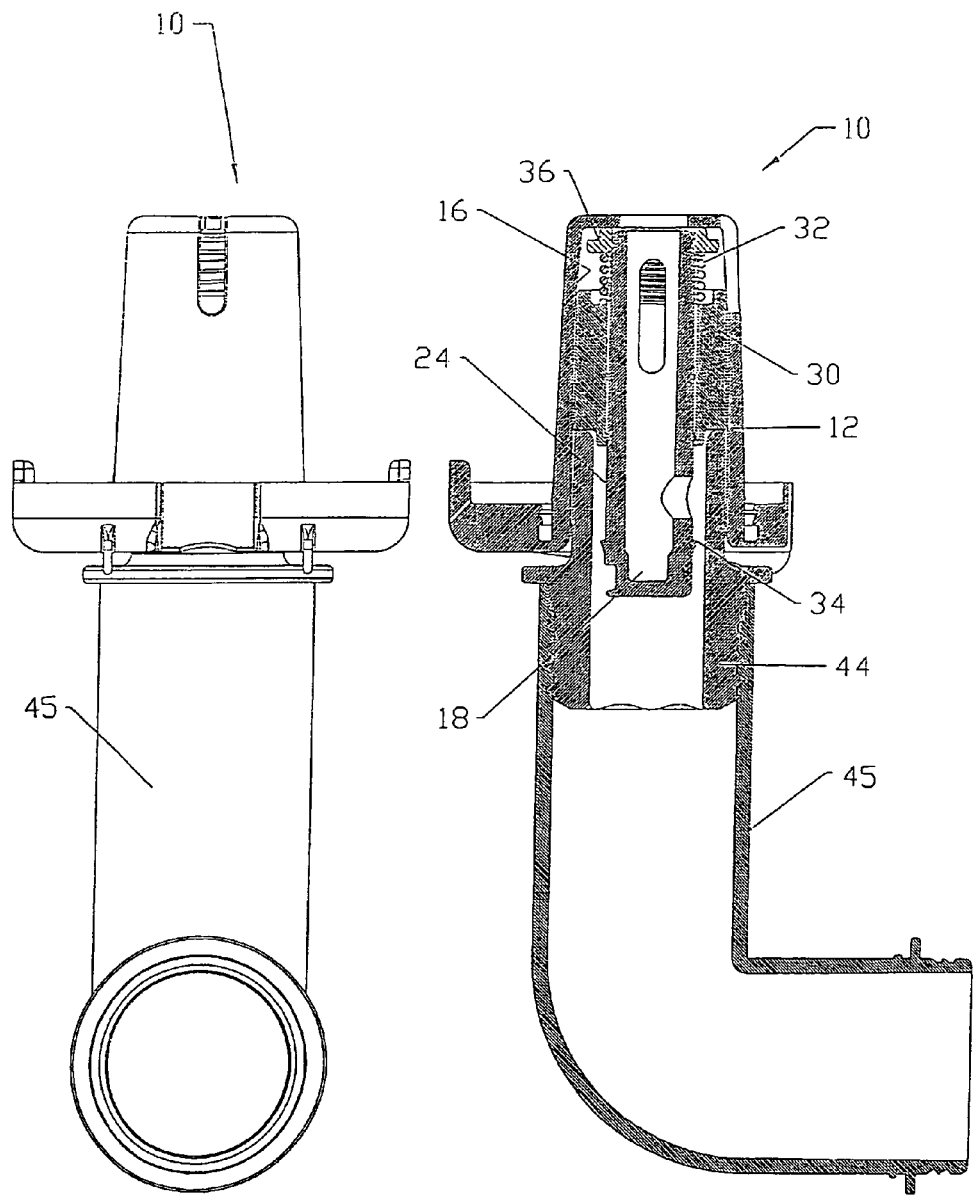
FIG. 9 is a side elevation view, of the valve illustrated in FIG. 1 engaged with a vertical pin coupling.
FIG. 10 is a side elevation view of the valve illustrated in FIG. 1 engaged with a vertical pin coupling.
Figure 11:
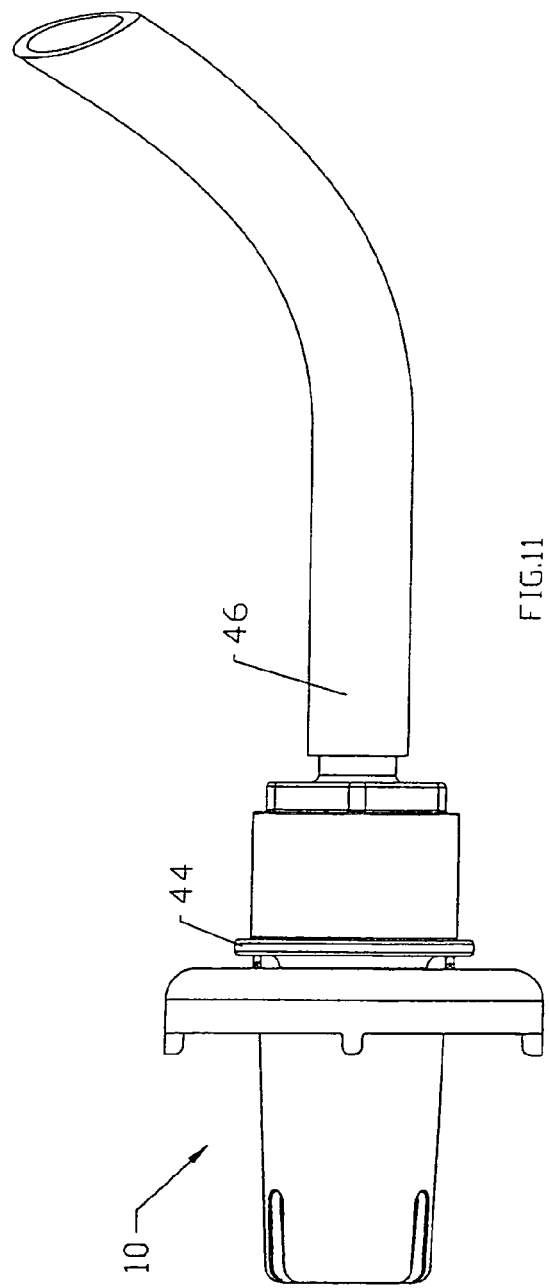
FIG. 11 is a side elevation view of the valve illustrated in FIG. 1, engaged with a vertical pin coupling.
Figure 12:
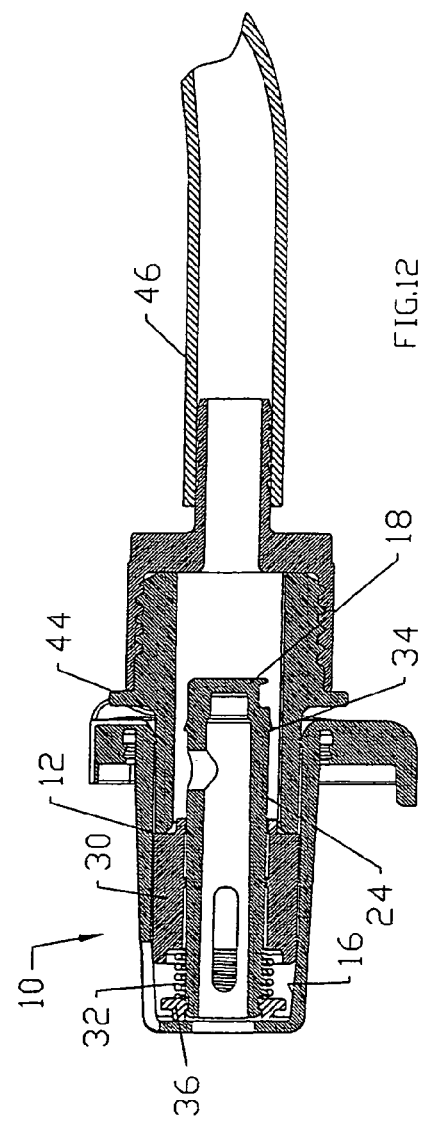
FIG. 12 is a side elevation view, in section, of the valve illustrated in FIG. 1, engaged with a hose coupling.
Figure 13:
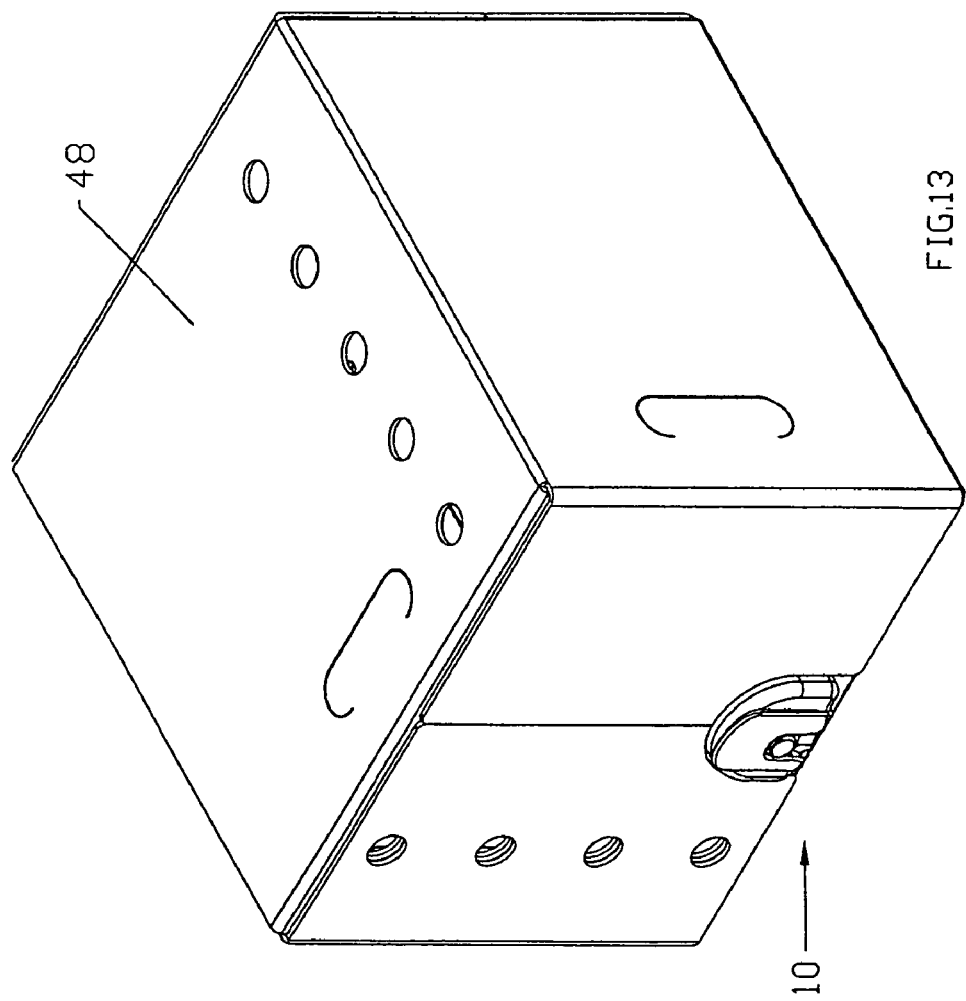
FIG. 13 is a perspective view of a container using the valve illustrated in FIG. 1 with the valve in a closed position.
Figure 14:
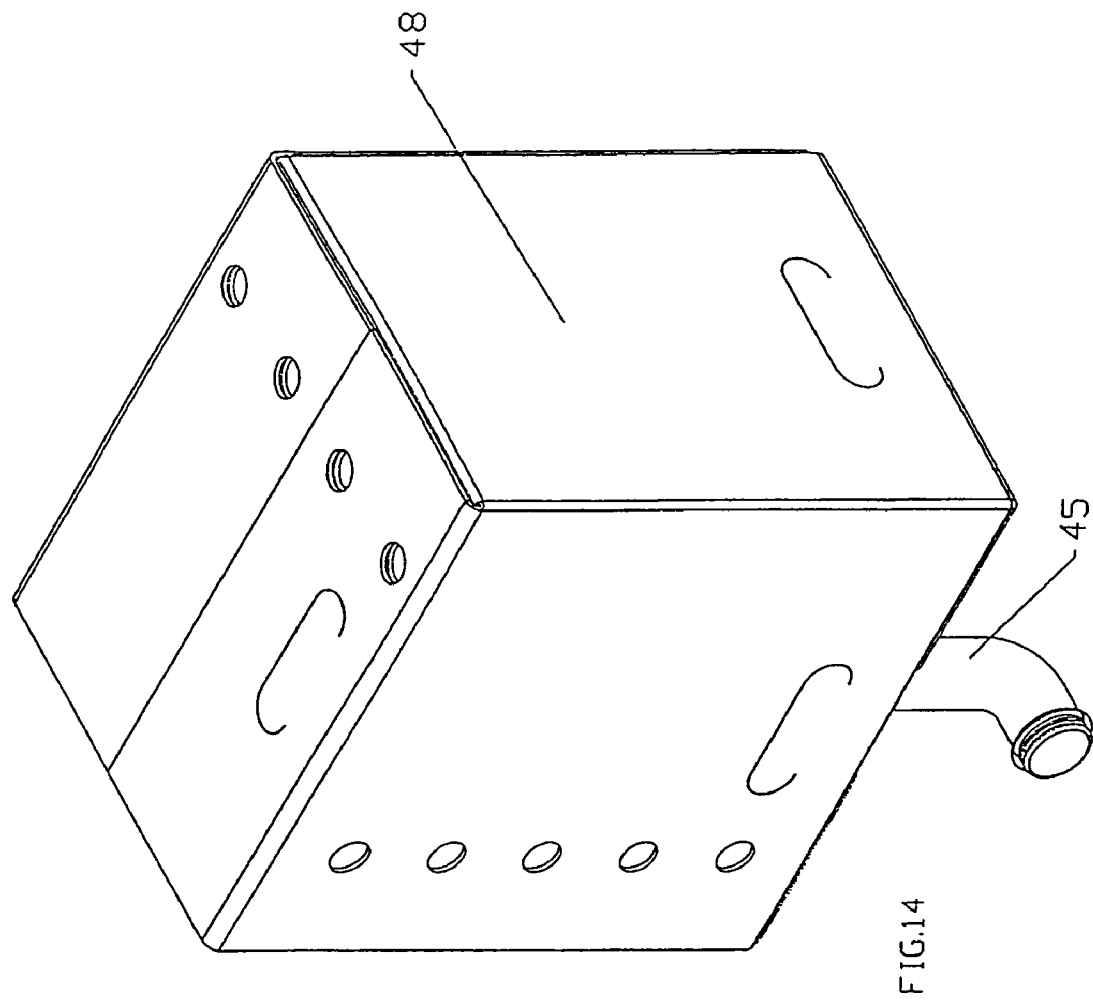
FIG. 14 is a perspective view of a container using the valve illustrated in FIG. 1.
Figure 15:
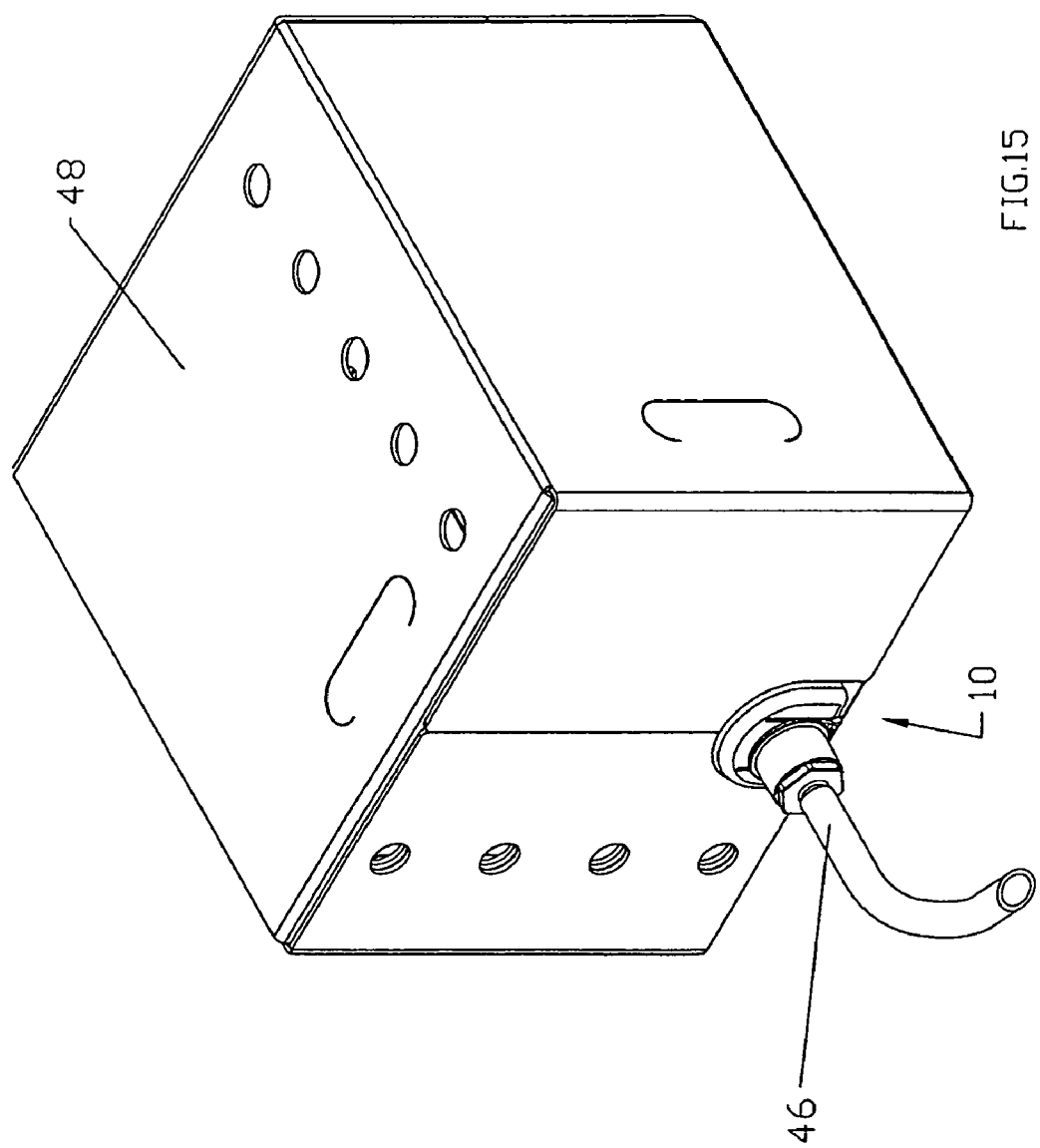
FIG. 15 is a perspective view of a container the valve illustrated in FIG. 1, with the valve engaged with a hose coupling.
Figure 16:
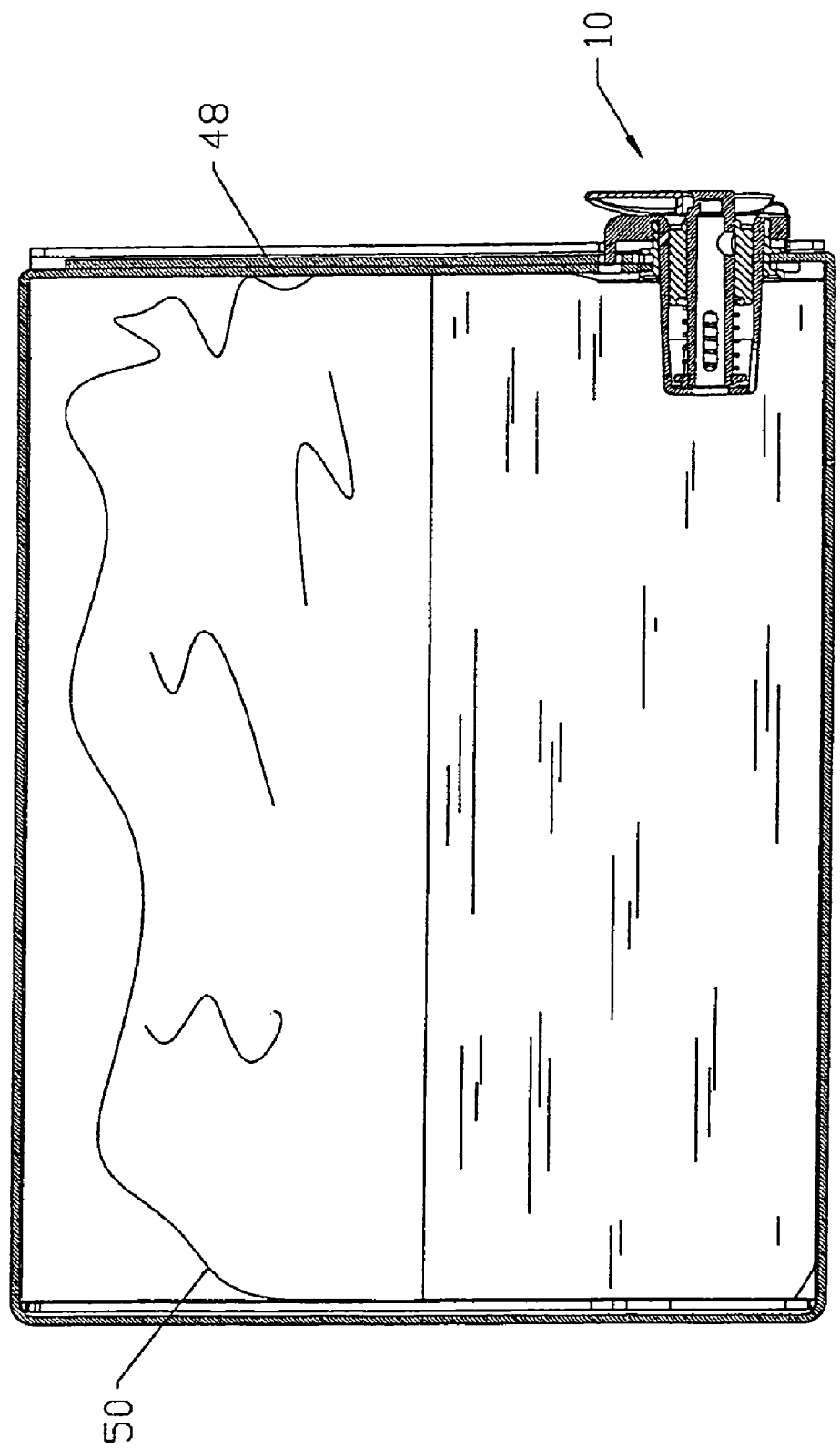
FIG. 16 is a side elevation view, in section, of the container illustrated in FIG. 13.
Figure 17:
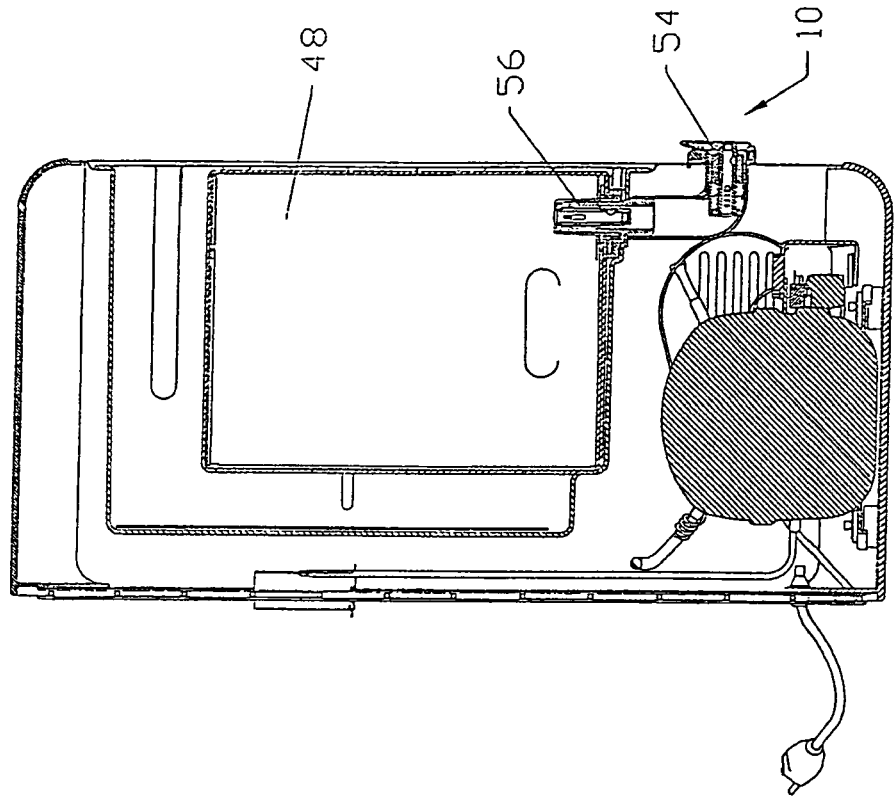
FIG. 17 is a front elevation view, in section, of a cooler using a combination of valves for a liquid dispensing system.
Figure 18:
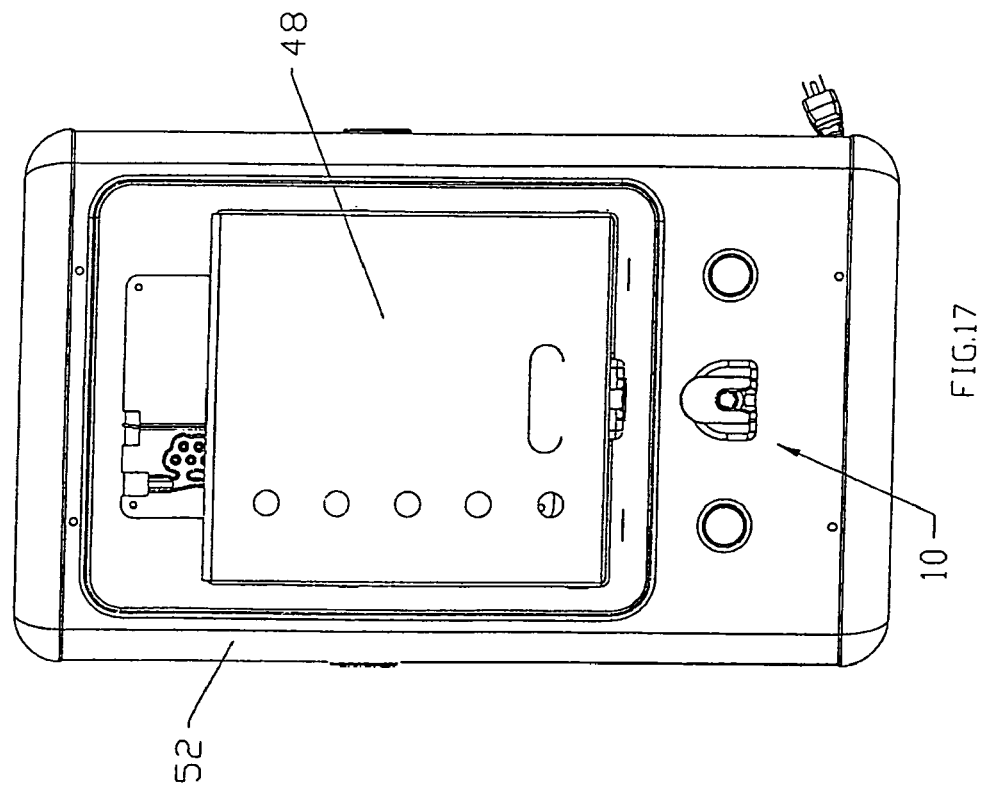
FIG. 18 is a side elevation view, in section, of the cooler illustrated in FIG. 17.

Referring to FIGS. 6, 8, 10 and 12, valve 10 is further adapted with stops 34, which limit relative movement of pin 18 and plunger 30 and a retaining ring 36, which retains spring 32. Ring 32 is provided for biasing first plunger 30 toward a normally closed position. Depending upon the mode desired, valve 10 may operate such that pin 18 is moved to open flow, annular plunger 30 is moved to open flow or valve 10 may embody both. Referring to FIGS. 1 through 8, pin 18 is actuated manually with a handle 38. Handle 38 can be detachable as will hereinafter be described. Referring to FIGS. 6 and 8, handle 38 operates by way of a lever 40 and a fulcrum 42. Referring to FIGS. 10 and 12, annular plunger 30 is actuated by way of a coupling 44 such that radial dispensing passage 28 is opened without movement of pin 18. Referring to FIGS. 9 and 10 coupling 44 is most likely used in conjunction with an upstanding pin 45, although it can also be used in with a hose 46 as illustrated in FIGS. 11 and 12. It will be appreciated that all of the illustrated embodiments show annular plungers 30 allowing both possibilities. Referring to FIGS. 13, 14, 15 and 16, valve 10 may be used in conjunction with liquid containers 48 with bladders 50. Referring to FIGS. 17 and 18, valve 10 may also be used in conjunction with coolers 52 such that a combination of modes of valve 10, one with a handle actuated pin 54 and another with a coupler actuated annular plunger 56 can be used.

Figure 4:
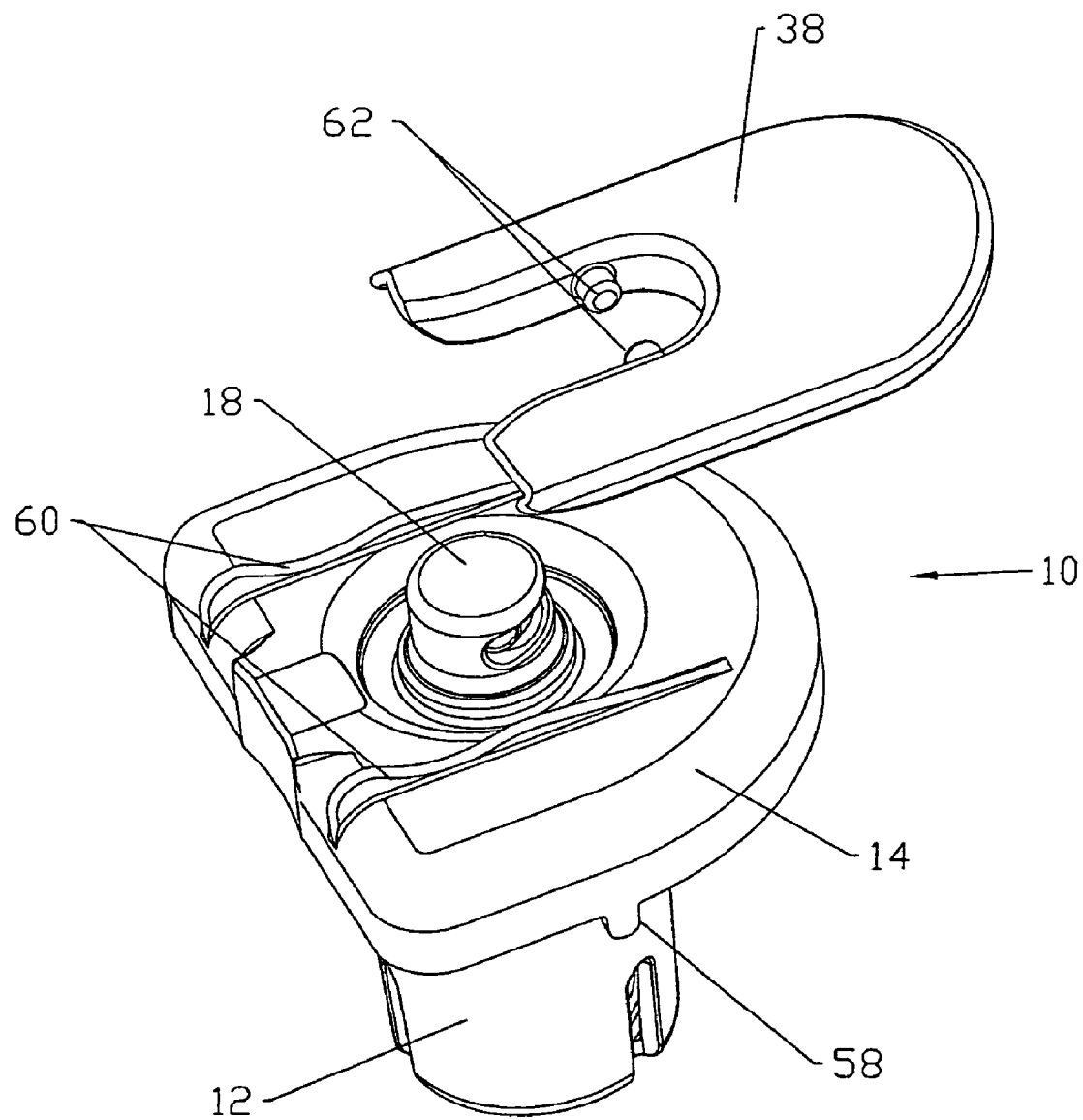
FIG. 4 is a perspective view of the valve illustrated in FIG. 1, in which the detachable handle has been removed.

Referring to FIGS. 3 and 4, mounting flange 14 is provided with lockpins 58 to fit within a liquid container and guide protrusions 60 for axial and radial alignment of handle 38 during activation. Hollow dispensing pin 18 that is positioned within casing 12 is configured to adopt handle 38 which can be pivoted by means of pivoting pins 62. Referring to FIG. 4, if necessary, handle 38 can be snapped off to detach it from mounting flange 14.

Operation:

The use and operation of valve for liquid dispensing system 10 will now be described with reference to FIGS. 1 through 18. Referring to FIG. 3, valve 10 is provide with a casing 12, mounting flange 14, retainer 36, spring 32, annular plunger 30, pin 18 and handle 38. Referring to FIGS. 1 and 2, valve 10 is adapted such that casing 12 will extend and fit within liquid container 48 as illustrated in FIGS. 13 through 16, or extend and fit at the end of a liquid passage as illustrated in FIG. 17, or such that a combination of modes are used as illustrated in FIG. 18. Upon installation, referring to FIGS. 5 through 12, a user may open valve 10 either by leveraging handle 38 or inserting coupling 44, overcoming biasing pressure of spring 32 so as to either actuate dispensing pin plunger 18 or annular plunger 30. Referring to FIG. 4, handle 38 may be detached to facilitate inserting of coupling 44. Referring to FIGS. 5 through 12, in either case, liquid may then be dispensed through radial dispensing passage 28.

Although the illustrations show an embodiment that has both a dispensing pin plunger and an annular plunger. It will be appreciated that the system would operate with only a dispensing pin plunger, if annular plunger were fixed; and the system would operate with only an annular plunger, if the dispensing pin plunger were fixed.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the claims.

The invention claimed is:

1. A valve for a liquid dispensing system, comprising:
a casing having an interior sidewall;
a hollow dispensing pin positioned within the casing, the dispensing pin having a first end, a second end, an exterior surface, and an interior flow passage, the dispensing pin being movable relative to the casing;
at least one radial dispensing passage from the interior flow passage through to the exterior surface at the first end of the dispensing pin;
a first plunger disposed between the interior sidewall of the casing and the exterior surface of the dispensing pin and engaging both the interior surface of the casing and the exterior surface of the dispensing pin, the first plunger being movable relative to the casing and the dispensing pin while maintaining the dispensing pin stationary relative to the casing, the first plunger being movable between a closed position blocking any flow through the at least one radial dispensing passage and a first open position toward the second end of the dispensing pin spaced from the at least one radial dispensing passage, and the dispensing pin being movable relative to the casing between the closed position and a second open position in which the first end of the dispensing pin is moved outward from the first plunger; and means for biasing the first plunger toward a normally closed position.

2. The valve as defined in claim 1, wherein the first plunger is annular.

3. The valve as defined in claim 1, wherein the first plunger is moved from the open position to the closed position by insertion of a coupling between the interior sidewall of the casing and the exterior surface of the dispensing pin.

4. The valve as defined in claim 1, wherein the casing has an outwardly extending mounting flange.

5. The valve as defined in claim 1, wherein the means for biasing the first plunger is a spring.

6. The valve as defined in claim 1, wherein the dispensing pin is movable and serves as a second plunger, the dispensing pin being movable between a closed position recessed within the casing in which any flow through the at least one radial dispensing passage is blocked by the first plunger and an open position is which the first end of the dispensing pin on which the at least one radial dispensing passage is positioned projects outwardly from the casing and is spaced from the first plunger, means being provided to bias the dispensing pin toward the closed position.

7. A valve for a liquid dispensing system, comprising:
  a casing having a first end, a second end, an interior sidewall that extends between the first end and the second end, a liquid inlet positioned at the second end, an outwardly extending mounting flange positioned at the first end;
  a hollow dispensing pin plunger centrally positioned within the casing, the dispensing pin having a first end, a second end, an exterior surface between the first end and the second end, an interior flow passage, and at least one radial dispensing passage from the interior flow passage through to the exterior surface toward the first end of the dispensing pin;
  an annular plunger disposed between the interior sidewall of the casing and the exterior surface of the dispensing pin plunger and engaging both the interior surface of the casing and the exterior surface of the dispensing pin plunger, the annular plunger having a first end and a second end, the annular plunger being movable relative to the casing and the dispensing pin while maintaining the dispensing pin stationary relative to the casing, the first plunger being movable between a closed position blocking any flow through the at least one radial dispensing passage and an open position toward the second end of the dispensing pin plunger spaced from the at least one radial dispensing passage;
  the dispensing pin plunger being movable relative to the casing and the annular plunger between a closed position recessed within the casing with any flow through the at least one radial dispensing passage blocked by the annular plunger and an open position in which the first end of the dispensing pin plunger projects from the casing past the first end of the annular plunger with the at least one radial dispensing passage spaced from the annular plunger; and
  a spring positioned between the second end of the annular plunger and the second end of the dispensing pin plunger, the spring acting upon both the annular plunger and the dispensing pin plunger to bias them toward a normally closed position.

8. The valve as defined in claim 7, wherein the annular plunger is moved from the open position to the closed position by insertion of an annular coupling between the interior sidewall of the casing and the exterior surface of the dispensing pin plunger.

9. The valve as defined in claim 7, wherein the dispensing pin plunger is moved from the closed position to the open position by manipulation of a handle.

10. The valve as defined in claim 9, wherein the handle is a lever having a fulcrum acting against the flange on the casing.

11. The valve as defined in claim 9, wherein the handle is detachable.

12. The valve as defined in claim 7, wherein outwardly projecting stops are positioned at the first end of the dispensing pin plunger, the stops limiting relative movement of the dispensing pin plunger and the annular plunger.

13. The valve as defined in claim 7, wherein a retaining ring is positioned at the second end of the dispensing pin plunger to retain the spring.

\* \* \* \* \*